US010851293B2

(12) United States Patent
Du et al.

(10) Patent No.: US 10,851,293 B2
(45) Date of Patent: Dec. 1, 2020

(54) PHOSPHOR MATERIALS FOR LIGHT SOURCES AND METHOD FOR MANUFACTURING THE SAME

(71) Applicant: Current Lighting Solutions, LLC, East Cleveland, OH (US)

(72) Inventors: Fangming Du, Northfield, OH (US); William Winder Beers, Chesterland, OH (US); William Erwin Cohen, Solon, OH (US); Clark David Nelson, East Cleveland, OH (US)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 350 days.

(21) Appl. No.: 15/411,250

(22) Filed: Jan. 20, 2017

(65) Prior Publication Data

US 2017/0298273 A1  Oct. 19, 2017

Related U.S. Application Data (60) Provisional application No. 62/322,366, filed on Apr. 14, 2016.

(51) Int. Cl.
*C09K 11/08* (2006.01)
*C09K 11/61* (2006.01)

(52) U.S. Cl.
CPC ............ *C09K 11/08* (2013.01); *C09K 11/617* (2013.01)

(58) Field of Classification Search
CPC .............................. C09K 11/617; C09K 11/61
See application file for complete search history.

(56) References Cited

U.S. PATENT DOCUMENTS

| 7,358,542 | B2 | 4/2008 | Radkov et al. | |
| 7,648,649 | B2 | 1/2010 | Radkov et al. | |
| 8,252,613 | B1* | 8/2012 | Lyons ................. | C09K 11/617 438/46 |
| 8,710,487 | B2 | 4/2014 | Lyons et al. | |
| 2015/0054400 | A1* | 2/2015 | Murphy ............... | C09K 11/675 313/503 |
| 2015/0166887 | A1 | 6/2015 | Murphy et al. | |

OTHER PUBLICATIONS

International Search Report and Written Opinion issued in connection with corresponding PCT Application No. PCT/US2017/26744 dated Jul. 19, 2017.

* cited by examiner

*Primary Examiner* — C Melissa Koslow
(74) *Attorney, Agent, or Firm* — Buckley, Maschoff & Talwalkar LLC (57) ABSTRACT

A method includes mixing a first fluoride phosphor powder that is doped with tetravalent manganese with a treatment solution for a designated period of time, stopping the mixing to allow the fluoride phosphor powder to settle, removing at least some liquid that has separated from the first fluoride phosphor powder, repeating (a) the mixing, (b) the stopping of the mixing, and (c) removing at least some of the liquid during one or more additional cycles, and obtaining a second fluoride phosphor powder following the repeating of the mixing, the stopping of the mixing, and the removing of at least some of the liquid. The second fluoride phosphor powder includes a reduced amount of the manganese relative to the first fluoride phosphor powder.

18 Claims, 5 Drawing Sheets

FIG. 7 ations No. 62/322,366, filed 14 Apr. 2016, the entire disclosure of which is incorporated herein by reference.
PHOSPHOR MATERIALS FOR LIGHT SOURCES AND METHOD FOR MANUFACTURING THE SAME

CROSS-REFERENCE TO RELATED APPLICATIONS

This application claims priority to U.S. Provisional Application No. 62/322,366, filed 14 Apr. 2016, the entire disclosure of which is incorporated herein by reference.

BACKGROUND

Some light sources include phosphor bodies disposed on or near the light sources. These phosphor bodies, or phosphors, receive at least some of the light generated by the light sources. The received light causes the phosphors to emit light. For example, some light emitting diodes (LEDs) include red-emitting phosphors that receive light generated by the LEDs to emit light.

The red-emitting phosphors may be based on complex fluoride materials that are activated by tetravalent manganese ($Mn^{4+}$). When these phosphors with tetravalent manganese doping are exposed to moisture in the air, the tetravalent manganese can be oxidized to create manganese dioxide ($MnO_2$). This results in degradation of the luminance and reliability of the phosphors.

One attempt to remove the tetravalent manganese from the phosphors includes adding the phosphor to a saturated $K_2SiF_6$/HF solution with a liquid-to-powder ratio ranging from 10:1 to 20:1 (with the ratio being a volume to weight ratio, such as milliliters to grams). After mixing for roughly 30 minutes, a majority of the surface manganese is dissolved from the powder into the solution. However, this method has relatively low output and the removal of the surface manganese may not be sufficient to significantly improve the luminance or reliability of the phosphors.

BRIEF DESCRIPTION

In one embodiment, a method includes mixing a first fluoride phosphor powder that is doped with tetravalent manganese with a treatment solution for a designated period of time within a container, stopping the mixing of the first fluoride phosphor powder with the treatment solution in the container to allow the fluoride phosphor powder to settle in the treatment solution and at least some liquid in the container to separate from the first fluoride phosphor powder, removing at least some of the liquid that has separated from the first fluoride phosphor powder from the container, repeating (a) the mixing the first fluoride phosphor powder with the treatment solution, (b) the stopping the mixing of the first fluoride phosphor powder with the treatment solution, and (c) the removing the at least some of the liquid during one or more additional cycles, and obtaining a second fluoride phosphor powder from the container as a remaining amount of the first fluoride phosphor powder following the repeating of the mixing of the first fluoride phosphor powder with the treatment solution, the stopping of the mixing of the first fluoride phosphor powder with the treatment solution, and the removing of the at least some of the liquid during one or more additional cycles. The second fluoride phosphor powder includes a reduced amount of the manganese relative to the first fluoride phosphor powder.

In one embodiment, a method includes mixing a first fluoride phosphor powder that is doped with a dopant with a treatment solution to form a mixture, agitating the mixture of the first fluoride phosphor powder and the treatment solution for at least first designated period of time, stopping agitation of the mixture for at least a second designated period of time to allow liquid in the mixture to separate from the mixture, removing at least some of the liquid from the mixture, repeating (a) mixing the first fluoride phosphor powder with the treatment solution, (b) agitating the mixture, (c) stopping the agitation of the mixture, and (d) removing the at least some of the liquid from the mixture one or more additional times, and obtaining a second fluoride phosphor powder from the mixture following the repeating of mixing the first PFS powder with the treatment solution, agitating the mixture, stopping the agitation, and removing the at least some of the liquid from the mixture. The second fluoride phosphor powder includes a reduced amount of the dopant relative to the first fluoride phosphor powder.

In one embodiment, a method includes mixing a first fluoride phosphor powder that is doped with tetravalent manganese with a hydrofluoric acid solution to form a mixture, agitating the mixture of the first fluoride phosphor powder and the hydrofluoric acid solution for at least first designated period of time, stopping agitation of the mixture for at least a second designated period of time to allow liquid in the mixture to separate from the mixture, removing at least some of the liquid from the mixture, repeating (a) mixing the first fluoride phosphor powder with the hydrofluoric acid solution, (b) agitating the mixture, (c) stopping the agitation of the mixture, and (d) removing the at least some of the liquid from the mixture one or more additional times, and obtaining a second fluoride phosphor powder from the mixture following the repeating of mixing the first PFS powder with the hydrofluoric acid solution, agitating the mixture, stopping the agitation, and removing the at least some of the liquid from the mixture. The second fluoride phosphor powder includes a reduced amount of manganese relative to the first fluoride phosphor powder.

BRIEF DESCRIPTION OF THE DRAWINGS

The subject matter described herein will be better understood from reading the following description of non-limiting embodiments, with reference to the attached drawings, wherein below.

DETAILED DESCRIPTION

The inventive subject matter described herein provides methods for manufacturing phosphors and the resultant phosphors created by the methods. The methods described herein can be used to create red-emitting phosphors having better manufacturability and improved water resistibility (relative to red-emitting phosphors created using other methods). The red-emitting phosphors are based on (e.g., created using) complex fluoride materials that are activated by tetravalent manganese ($Mn^{4+}$). As described herein, the methods include using a solution comprising a fluoride phosphor activated with tetravalent manganese and represented by the formula $K_2[M_{1-a}Mn^{4+}{}_aF_6]$, where M is at least one selected from group IV elements of titanium (Ti), zirconium (Zr), and hafnium (Hf) and group IVB elements of silicon (Si), germanium (Ge), and tin (Sn), and where α has a value of greater than zero and less than 0.2. While the description herein focuses on potassium hexafluorosilicate ($K_2SiF_6$), not all embodiments of the inventive subject matter is limited to potassium hexafluorosilicate and one or more embodiments may be practiced with another fluoride phosphor activated with tetravalent manganese and represented by the formula $K_2[M_{1-a}Mn^{4+}{}_aF_6]$. Optionally, another phosphor material may be used, such as a phosphor represented by the formula $A_x[MF_y]:Mn^{4+}$, where A represents lithium, sodium, potassium, rubidium, caesium, or a combination of two or more of these materials, M represents silicon, germanium, tin, titanium, zirconium, aluminum, gallium, indium, scandium, hafnium, yttrium, lanthanum, niobium, tantalum, bismuth, gadolinium, or a combination of two or more of these elements, x has a value of the absolute value of the charge of the [$MF_y$] ion, and y has a value of 5, 6, or 7.

One or more embodiments of the methods described herein use a solution comprising a fluoride phosphor and hydrofluoric acid (HF) with a lower liquid to powder ratio (e.g., ranging from a liquid volume to weight ratio of 2:1 to 5:1 milliliters to grams), and a much shorter mixing time. After mixing is complete, a top clear liquid is decanted from the solution and a fresh $K_2SiF_6$/HF solution with the same liquid to powder ratio is added. This cycle is repeated several times until little to no visible brown color in the decanted liquid is present. By using this new treatment, the output of the phosphor is greatly increased and the resulting phosphor has better water resistibility because more tetravalent manganese is removed from the phosphor powder surface.

When a red phosphor powder, such as potassium hexafluorosilicate ($K_2SiF_6$) doped with manganese is mixed with the saturated $K_2SiF_6$/HF solution, two reactions happen. The first reaction includes the potassium hexafluorosilicate doped with manganese ($K_2SiF_6$:Mn) leaving the solid phase and entering the liquid phase. The second reaction includes this same material precipitating out from the liquid phase and re-depositing onto the solid surface. In order to remove more manganese from the solid surface, the second reaction needs to be limited. As compared to the current process for manufacturing some red-emitting phosphors, the new manufacturing processes greatly restrain the second reaction and promote the first reaction, which leads to better removal of manganese from the powder surface of the potassium hexafluorosilicate. This new process also uses a lower liquid-to-powder ratio, which allows for increased output of potassium hexafluorosilicate for manufacturing phosphors with the same amount of starting materials.

Figure 1:
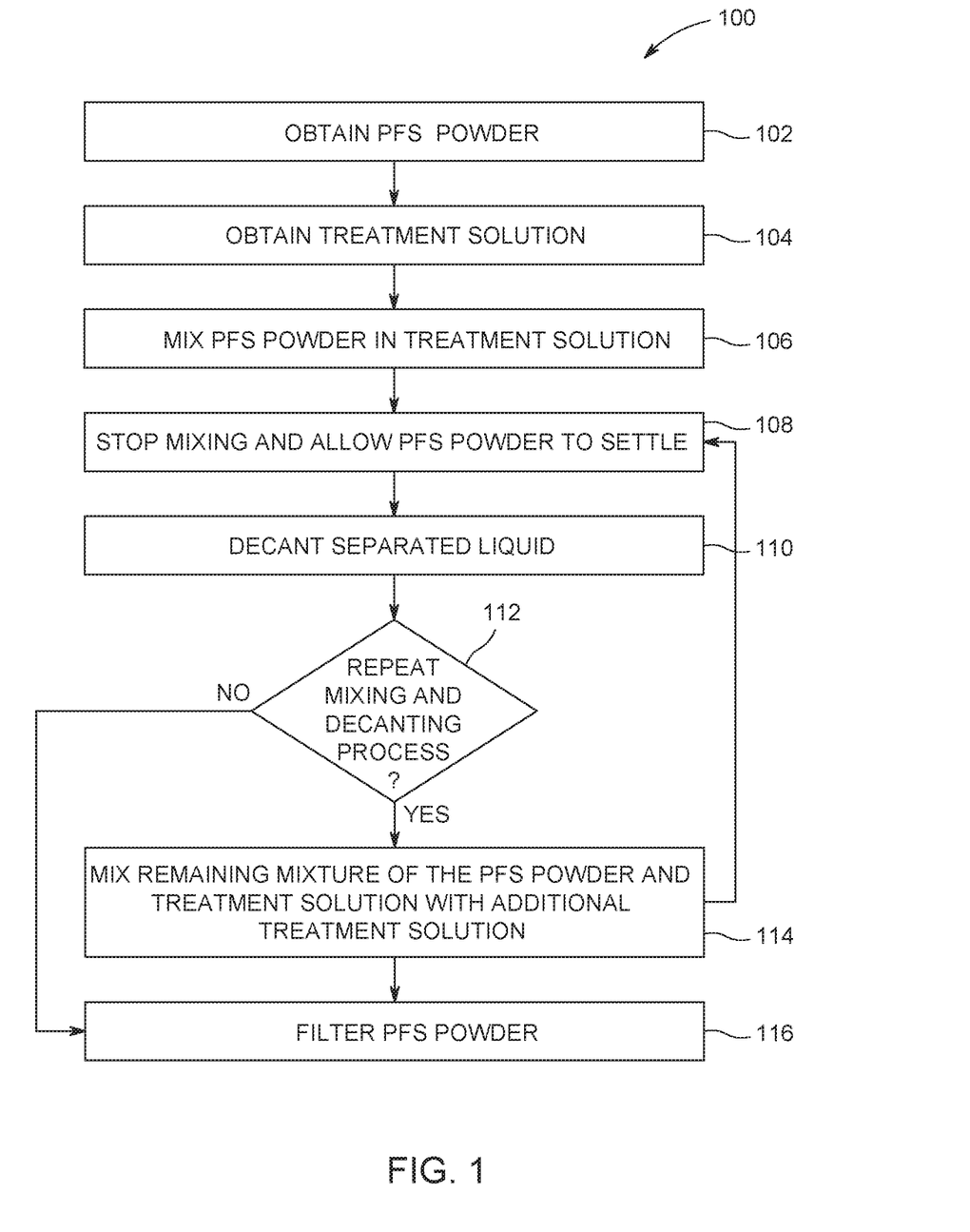
FIG. 1 illustrates a flowchart of one embodiment of a method for manufacturing material used in a phosphor.

FIG. 1 illustrates a flowchart of one embodiment of a method 100 for manufacturing material used in a phosphor, such as a red-emitting phosphor. At 102, a fluoride phosphor powder, such as a potassium fluorosilicate (PFS) powder, is obtained. This powder can include potassium hexafluorosilicate that is doped with tetravalent manganese (Mn4+), which may be represented as $K_2SiF_6$:$Mn^{4+}$). The PFS powder can be fired in the presence of a source of fluorine.

Figure 2:
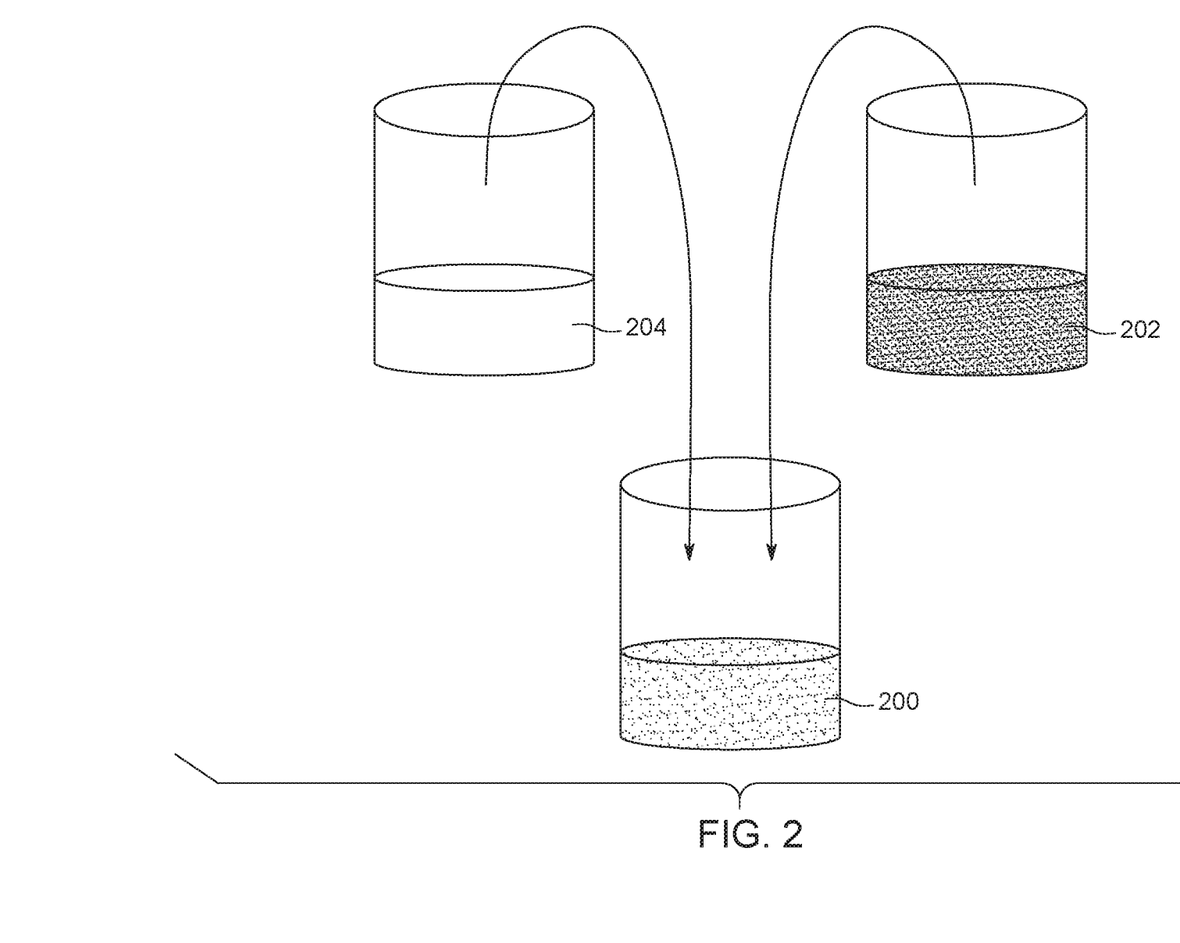
FIG. 2 illustrates formation of a treatment solution according to one example.

At 104, a treatment solution is obtained. The treatment solution may be formed from a fluoride powder mixed with an acid, such as hydrofluoric acid (HF). In one embodiment, the treatment solution is formed from potassium hexafluorosilicate mixed with hydrofluoric acid. The potassium hexafluorosilicate in the treatment solution may not be doped with tetravalent manganese. With continued reference to the flowchart of the method 100 shown in FIG. 1, FIG. 2 illustrates formation of a treatment solution 200 according to one example. As described above, the treatment solution 200 can be formed from mixing a powder of potassium hexafluorosilicate 202 with hydrofluoric acid 204.

Figure 3:
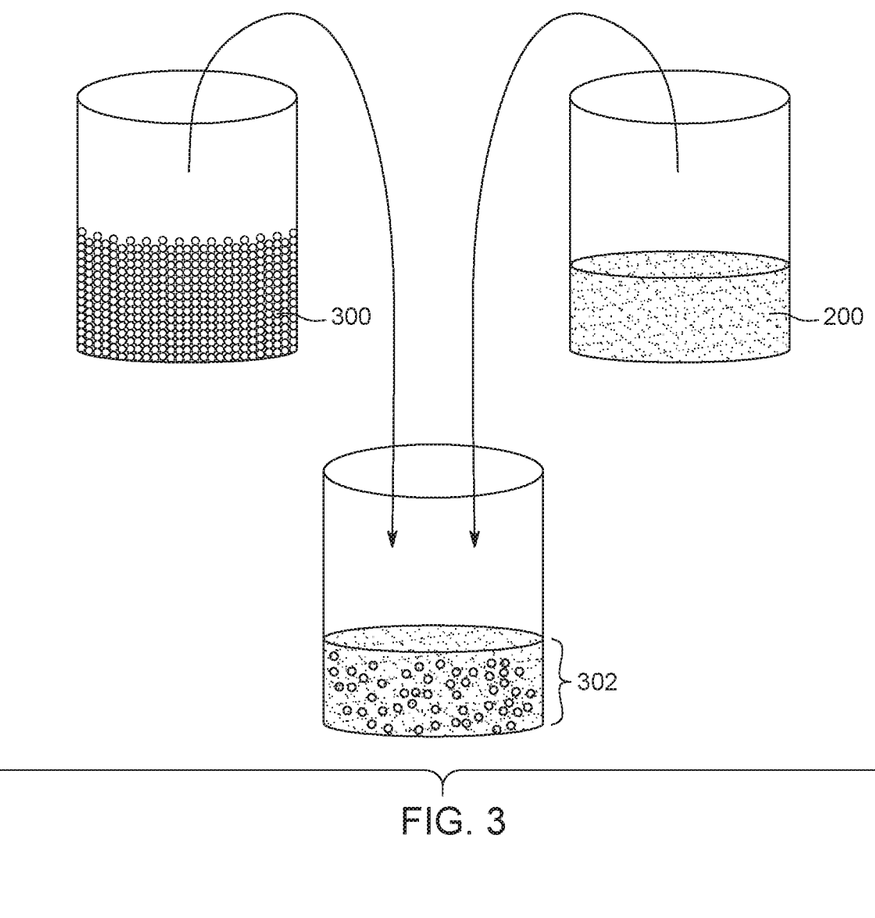
FIG. 3 illustrates addition of a PFS powder to the treatment solution shown in FIG. 2 to form a mixture of the powder and the treatment solution.

At 106 in FIG. 1, the PFS powder obtained at 102 is mixed with the treatment solution obtained at 104. FIG. 3 illustrates addition of a PFS powder 300 to the treatment solution 200 to form a mixture 302 of the powder 300 and the treatment solution 200. The PFS powder 300 can include potassium hexafluorosilicate doped with tetravalent manganese in one embodiment. The amounts of PFS powder 300 and the treatment solution 200 that are used to form the mixture 302 can be based on a designated ratio of the volume of the treatment solution 200 (e.g., in milliliters) to the weight of the PFS powder 300 (e.g., in grams), such as a ratio of at least two to one to no more than five to one. Alternatively, another ratio may be used, such as no more than six to one or no more than seven to one.

Figure 4:
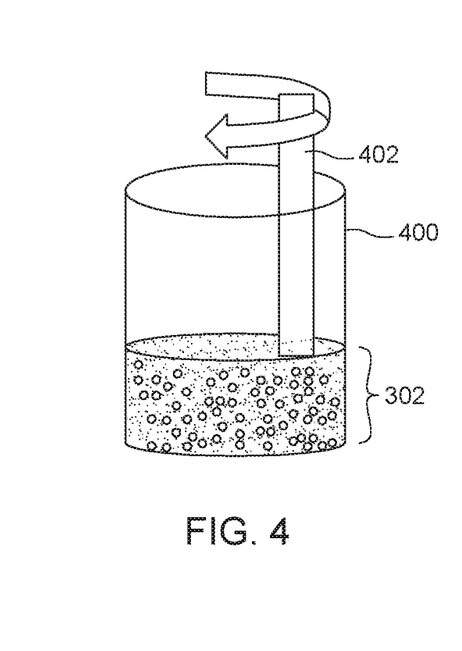
FIG. 4 illustrates one example of agitation of the mixture of the PFS powder and the treatment solution.

The mixture 302 of the PFS powder 300 and the treatment solution 200 can be agitated for a designated period of time in one embodiment. FIG. 4 illustrates one example of agitation of the mixture 302 of the PFS powder 300 and the treatment solution 200. The mixture 302 can be agitated by moving a container 400 holding the mixture 302 and/or by moving a mixing body 402 within the mixture 302, such as a paddle, stir bar, flea, magnet, etc. The mixture 302 can be agitated, or mixed, for approximately five minutes, such as at least four minutes and no more than six minutes, at least 4.5 minutes and no more than 5.5 minutes, or another period of time.

Figure 5:
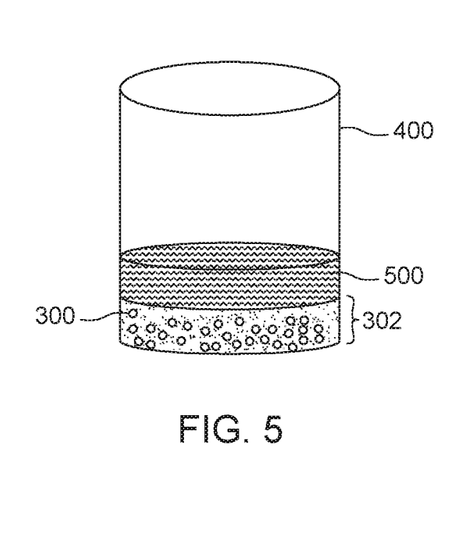
FIG. 5 illustrates the mixture shown in FIG. 3 after mixing and after allowing the PFS powder to settle according to one embodiment.

At 108, the mixing or agitation of the mixture 302 is stopped and the PFS powder 300 in the mixture 302 is allowed to settle. The mixing may be stopped for at least a designated period of time, such as approximately one minute, at least three minutes, at least two minutes but no more than four minutes, at least 2.5 minutes but no more than 3.5 minutes, or another period of time. Stopping the mixing of the mixture 302 allows the PFS powder 300 to settle toward the bottom of the container 400. FIG. 5 illustrates the mixture 302 after mixing at 106 and after allowing the PFS powder 300 to settle according to one embodiment. As shown in FIG. 5, some of the liquid constituents in the mixture 302 may separate from the powder 300 as a separated liquid 500 in the container 400. This liquid 500 may be one half or approximately one half of the total amount of the mixture 302.

The liquid 500 may separate from the mixture 302 in that the liquid 500 may not include the powder 300 or may include an amount of the powder 300 that is less than the mixture 302. For example, the liquid 500 may not include any of the powder 300, the liquid 500 may include some tetravalent manganese (but less tetravalent manganese than the mixture 302, and/or the liquid 500 may include some of the powder 300 (but less than the mixture 302). The liquid 500 may be formed from a mixture of the hydrofluoric acid and the manganese dopant of the powder 300 in one embodiment.

Figure 6:
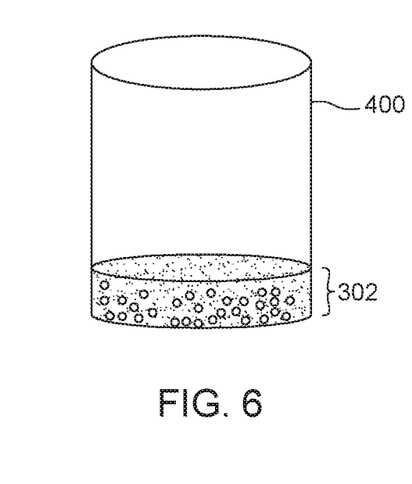
FIG. 6 illustrates the mixture shown in FIG. 3 after removing a separated liquid according to one example.

At 110, the separated liquid 500 is decanted from the container 400. The liquid 500 may be decanted from the container 400 by removing the liquid 500 from the container 400 without disrupting the powder 300 that has at least partially settled in the container 400. For example, the liquid 500 may be removed by pouring the liquid 500 out of the container 400, by sucking the liquid 500 out of the container 400, or in another manner. FIG. 6 illustrates the mixture 302 after removing the separated liquid 500 from the container 400 according to one example. As shown in FIG. 6, the total amount of mixture 302 in the container 400 has decreased due to removal of the separated liquid 500. The separated liquid 500 can include some of the tetravalent manganese from the powder 300 in the mixture 302, and the removal of the liquid 500 can reduce the total amount of manganese in the mixture 302 and on the powder 300.

At 112, a determination is made as to whether the process of mixing the PFS powder in the treatment solution and subsequently decanting the separated liquid from the mixture of the powder and the treatment solution is to be repeated one or more times. For example, a decision may be made as to whether additional treatment solution 200 is to be added to the mixture 302 of the PFS powder 302 and the treatment solution 200, this new mixture agitated and then allowed to rest, and then the separated liquid 500 from this new mixture removed from the new mixture one or more additional times. If this process is to be repeated, then flow of the method 100 can proceed toward 114. If the process is not to be repeated, then flow of the method 100 can proceed to 116.

Figure 7:
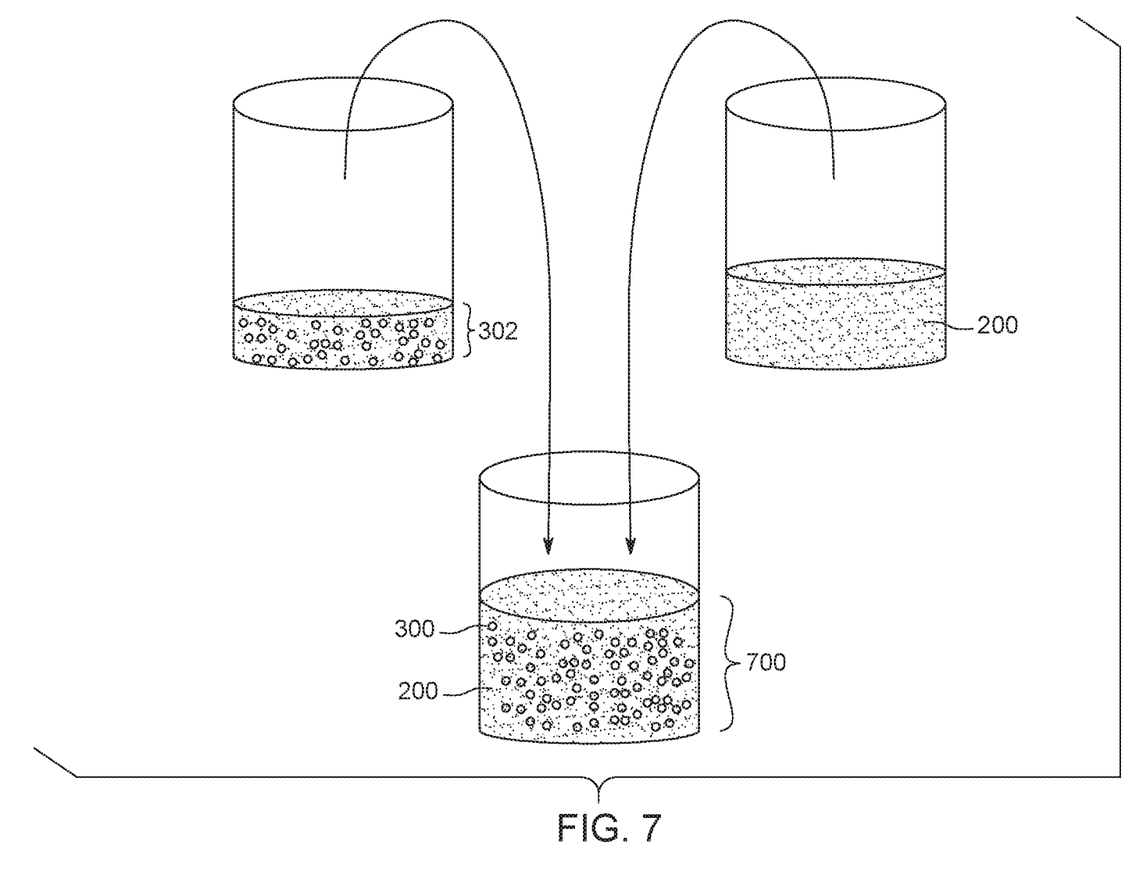
FIG. 7 illustrates the addition of more treatment solution with the previously obtained mixture to obtain a new, diluted mixture according to one embodiment.

At 114, an additional amount of treatment solution 200 is mixed with the remaining mixture 302 of the powder 300 and the treatment solution 200. FIG. 7 illustrates the addition of more treatment solution 200 with the previously obtained mixture 302 to obtain a new, diluted mixture 700 according to one embodiment. The new mixture 700 may be diluted in that the amount of manganese in the new mixture 700 is less than the amount of manganese in the previous mixture 302. The amount of the powder 300 in the new mixture 700 may not be diluted relative to the previous mixture(s). The mixture 302 shown in FIG. 6 may be mixed with additional treatment solution 200 so that the ratio of the liquid to solid in the new mixture 700 is within the range set forth above (e.g., at least 2:1 to no more than 5:1). Flow of the method 100 may then return to 108. For example, the new mixture 700 may be agitated and then allowed to rest (e.g., at 114 and 108). As described above, stopping the agitation allows liquid 500 that includes manganese to separate from the new mixture 700. This liquid 500 can then be removed from the new mixture 700 at 110 to reduce the manganese in the mixture 700. When the method 100 returns to 112, another determination may be made as to whether to mix in more treatment solution, allow the manganese-containing liquid to separate, and remove this liquid one or more additional times. In one embodiment, after the initial process of mixing the powder and the treatment solution, allowing the liquid to separate, and removing the liquid is performed, this process can be repeated a designated number of times, such as at least four additional times, at least five additional times, at least six additional times, or the like. Once the process of mixing, separating, and removing the liquid has been performed the designated number of times, flow of the method 100 can proceed to 116.

At 116, the PFS powder 300 remaining in the mixture 700 is filtered. For example, the mixture 700 may flow through a fibrous filter body, such as filter paper, one or more times. This filtering can extract the PFS powder 300 from the mixture 700. Due to the repeated separation of the manganese from the PFS powder 300, the amount of manganese in the PFS powder 300 is reduced while not reducing the amount of PFS powder 300 (or reducing the amount of PFS powder 300 by relatively small amounts, such as less than 3%, less than 1%, or less than 0.1%). The filtered PFS powder 300 can then be rinsed (e.g., with acetone) and dried (e.g., by drawing a vacuum through the filter paper on which the filtered PFS powder 300 is disposed). The PFS powder 300 may then be used to form one or more phosphors for a light source, such as by mixing the PFS powder 300 with a resinous material (e.g., silicone) and placing this mixture onto the light source.

Removing tetravalent manganese from PFS powder by repeatedly mixing the powder with the treatment solution, allowing the PFS powder to settle in the mixture, decanting the separated liquid containing at least some of the tetravalent manganese, and repeating this process one or more times can cause the amounts of manganese in the mixtures to gradually decrease, which prevents the manganese from settling on the PFS powder. The lower ratios of the treatment solution to the PFS powder (relative to other known processes) can reduce the amount of PFS powder that is lost during the mixing or that is not recovered for use in creating a phosphor.

Removing the tetravalent manganese from the PFS powder also can provide for a phosphor having a greater quantum efficiency (QE) than a phosphor created with a PFS powder that includes tetravalent manganese or that includes more tetravalent manganese. For example, mixing fifty grams of the PFS powder 300 with 1,000 milliliters of the treatment solution 200 for thirty minutes, followed by filtering the mixture of the PFS powder 300 and the treatment solution 200, rinsing the filtered resulting powder with acetone, and then vacuum drying the resulting powder produced PFS powder where 0.017% of the tetravalent manganese was removed. After exposing this PFS powder to high temperature and high humidity (HTHH) of 85 degrees Celsius at 85% humidity for 48 hours, the QE for the PFS powder was measured as 96.8%.

In contrast, mixing 200 grams of the same PFS powder 300 with only 600 milliliters of the same treatment solution 200, allowing this mixture to rest for five minutes, decanting the separated liquid on top of the rested mixture, adding 600 milliliters of the same treatment solution 200 for a second time, allowing this mixture to rest for five minutes, decanting the separated liquid on top of the rested mixture, adding 600 milliliters of the same treatment solution 200 for a third time, allowing this mixture to rest for five minutes, decanting the separated liquid on top of the rested mixture, adding 600 milliliters of the same treatment solution 200 for a fourth time, allowing this mixture to rest for five minutes, decanting the separated liquid on top of the rested mixture, adding 600 milliliters of the same treatment solution 200 for a fifth time, allowing this mixture to rest for five minutes, decanting the separated liquid on top of the rested mixture, adding 600 milliliters of the same treatment solution 200 for a sixth time, allowing this mixture to rest for five minutes, decanting the separated liquid on top of the rested mixture, followed by filtering the mixture of the PFS powder 300 and the treatment solution 200, rinsing the filtered resulting powder with acetone, and then vacuum drying the resulting powder produced PFS powder where 0.025% of the tetravalent manganese was removed. After exposing this PFS powder to the same HTHH for 48 hours, the QE for the PFS powder was measured as 97.2%. The difference between the QE of 96.8% and 97.2% for the different PFS powders is significant because the QE of the powders may decrease along a linear or substantially linear relationship with respect to time. As a result, the QE of the PFS powder that is only mixed with the treatment solution a single time would have a QE that is 6% less than the PFS powder mixed with the treatment solution multiple times after 30 days, a QE that is 12% less after 60 days, a QE that is 18% after 90 days, and so on, after exposure to the HTHH.

In one embodiment, a method to create red-emitting phosphors includes mixing a first fluoride phosphor powder that is doped with tetravalent manganese with a treatment solution for a designated period of time within a container, stopping the mixing of the first fluoride phosphor powder with the treatment solution in the container to allow the fluoride phosphor powder to settle in the treatment solution and at least some liquid in the container to separate from the first fluoride phosphor powder, removing at least some of the liquid that has separated from the first fluoride phosphor powder from the container, repeating (a) the mixing the first fluoride phosphor powder with the treatment solution, (b) the stopping the mixing of the first fluoride phosphor powder with the treatment solution, and (c) the removing the at least some of the liquid during one or more additional cycles, and obtaining a second fluoride phosphor powder from the container as a remaining amount of the first fluoride phosphor powder following the repeating of the mixing of the first fluoride phosphor powder with the treatment solution, the stopping of the mixing of the first fluoride phosphor powder with the treatment solution, and the removing of the at least some of the liquid during one or more additional cycles. The second fluoride phosphor powder includes a reduced amount of the manganese relative to the first fluoride phosphor powder.

In one example, the first and second fluoride phosphor powders include a fluoride phosphor activated with tetravalent manganese and represented by $K_2[M_{1-a}Mn^{4+}{}_aF_6]$, where M is at least one element selected from a group consisting of titanium (Ti), zirconium (Zr), hafnium (Hf), silicon (Si), germanium (Ge), and tin (Sn), and a has a value of greater than zero and less than 0.2.

In one example, mixing the first fluoride phosphor powder with the treatment solution includes agitating a mixture of the first fluoride phosphor powder and the treatment solution, and stopping the mixing includes stopping the agitation of the mixture of the first fluoride phosphor powder and the treatment solution.

In one example, mixing the first fluoride phosphor powder with the treatment solution includes placing the first fluoride phosphor powder in the treatment solution in a volume-to-weight ratio of at least two.

In one example, mixing the first fluoride phosphor powder with the treatment solution includes placing the first fluoride phosphor powder in the treatment solution in a volume-to-weight ratio of no more than five.

In one example, the treatment solution includes hydrofluoric acid.

In one example, the treatment solution includes a third fluoride phosphor powder that is free of manganese.

In one example, removing at least some of the liquid includes decanting the liquid from a mixture of the first fluoride phosphor powder and the treatment solution.

In one example, stopping the mixing of the first fluoride phosphor powder with the treatment solution in the container includes allowing the first fluoride phosphor powder to settle within a mixture of the first fluoride phosphor powder and the treatment solution for at least a second designated period of time.

In one example, the method also includes filtering the second fluoride phosphor powder, rinsing the second fluoride phosphor powder, and drying the second fluoride phosphor powder that is rinsed.

In one embodiment, a method to create red-emitting phosphors includes mixing a first fluoride phosphor powder that is doped with a dopant with a treatment solution to form a mixture, agitating the mixture of the first fluoride phosphor powder and the treatment solution for at least first designated period of time, stopping agitation of the mixture for at least a second designated period of time to allow liquid in the mixture to separate from the mixture, removing at least some of the liquid from the mixture, repeating (a) mixing the first fluoride phosphor powder with the treatment solution, (b) agitating the mixture, (c) stopping the agitation of the mixture, and (d) removing the at least some of the liquid from the mixture one or more additional times, and obtaining a second fluoride phosphor powder from the mixture following the repeating of mixing the first PFS powder with the treatment solution, agitating the mixture, stopping the agitation, and removing the at least some of the liquid from the mixture. The second fluoride phosphor powder includes a reduced amount of the dopant relative to the first fluoride phosphor powder.

In one example, the first and second fluoride phosphor powders include a fluoride phosphor activated with tetravalent manganese and represented by $K_2[M_{1-a}Mn^{4+}{}_aF_6]$, where M is at least one element selected from a group consisting of titanium (Ti), zirconium (Zr), hafnium (Hf), silicon (Si), germanium (Ge), and tin (Sn), and α has a value of greater than zero and less than 0.2.

In one example, the dopant includes tetravalent manganese.

In one example, mixing the first fluoride phosphor powder with the treatment solution includes placing the first PFS powder in the treatment solution in a volume-to-weight ratio of at least two.

In one example, mixing the first fluoride phosphor powder with the treatment solution includes placing the first fluoride phosphor powder in the treatment solution in a volume-to-weight ratio of no more than five.

In one example, the treatment solution includes hydrofluoric acid.

In one example, the treatment solution includes a third fluoride phosphor powder that does not include the dopant.

In one example, removing at least some of the liquid includes decanting the at least some of the liquid from the mixture of the first fluoride phosphor powder and the treatment solution.

In one embodiment, a method to create red-emitting phosphors includes mixing a first fluoride phosphor powder that is doped with tetravalent manganese with a hydrofluoric acid solution to form a mixture, agitating the mixture of the first fluoride phosphor powder and the hydrofluoric acid solution for at least first designated period of time, stopping agitation of the mixture for at least a second designated period of time to allow liquid in the mixture to separate from the mixture, removing at least some of the liquid from the mixture, repeating (a) mixing the first fluoride phosphor powder with the hydrofluoric acid solution, (b) agitating the mixture, (c) stopping the agitation of the mixture, and (d) removing the at least some of the liquid from the mixture one or more additional times, and obtaining a second fluoride phosphor powder from the mixture following the repeating of mixing the first PFS powder with the hydrofluoric acid solution, agitating the mixture, stopping the agitation, and removing the at least some of the liquid from the mixture. The second fluoride phosphor powder includes a reduced amount of manganese relative to the first fluoride phosphor powder.

In one example, the first and second fluoride phosphor powders include a fluoride phosphor activated with tetravalent manganese and represented by $K_2[M_{1-a}Mn^{4+}{}_aF_6]$, where M is at least one element selected from a group consisting of titanium (Ti), zirconium (Zr), hafnium (Hf), silicon (Si), germanium (Ge), and tin (Sn), and a has a value of greater than zero and less than 0.2.

In one example, mixing the first fluoride phosphor powder with the hydrofluoric acid solution includes placing the first fluoride phosphor powder in the hydrofluoric acid solution in a volume-to-weight ratio of at least two and no more than five.

In one example, the hydrofluoric acid solution includes a third fluoride phosphor powder that does not include manganese.

In one example, removing at least some of the liquid includes decanting the at least some of the liquid from the mixture of the first fluoride phosphor powder and the hydrofluoric acid solution.

Unless defined otherwise, technical and scientific terms used herein have the same meaning as is commonly understood by one having ordinary skill in the art to which this disclosure belongs. The terms "first", "second", and the like, as used herein, do not denote any order, quantity, or importance, but rather are employed to distinguish one element from another. Also, the terms "a" and "an" do not denote a limitation of quantity, but rather denote the presence of at least one of the referenced items. The use of "including," "comprising" or "having" and variations thereof herein, are meant to encompass the items listed thereafter and equivalents thereof, as well as additional items. The terms "connected" and "coupled" are not restricted to physical or mechanical connections or couplings, and can include electrical and optical connections or couplings, whether direct or indirect.

Furthermore, the skilled artisan will recognize the interchangeability of various features from different embodiments. The various features described, as well as other known equivalents for each feature, can be mixed and matched by one of ordinary skill in this art, to construct additional systems and techniques in accordance with principles of this disclosure.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is noted that various non-limiting embodiments, described and claimed herein, may be used separately, combined, or selectively combined for specific applications.

Further, some of the various features of the above non-limiting embodiments may be used to advantage, without the corresponding use of other described features. The foregoing description should therefore be considered as merely illustrative of the principles, teachings and exemplary embodiments of this invention, and not in limitation thereof.

The limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A method comprising:
    mixing a fluoride phosphor powder that is doped with tetravalent manganese with a treatment solution formed from a manganese-free fluoride phosphor powder mixed with a hydrofluoric acid for a designated period of time within a container, wherein the fluoride phosphor powder is a complex fluoride phosphor activated with tetravalent manganese and wherein the mixing includes placing the fluoride phosphor powder in the treatment solution in a volume of the solution-to-weight of the powder ratio of no more than five;
    stopping the mixing of the fluoride phosphor powder with the treatment solution in the container to allow the fluoride phosphor powder to settle in the treatment solution and at least some liquid in the container to separate from the fluoride phosphor powder;
    removing at least some of the liquid that has separated from the fluoride phosphor powder from the container;
    adding a second treatment solution, wherein the second treatment solution is a same type as the treatment solution;
    repeating the mixing the fluoride phosphor powder with the remaining treatment solution and the second treatment solution, the stopping the mixing of the fluoride phosphor pow der with the remaining treatment solution and the second treatment solution, and the removing the at least some of the liquid for one or more additional cycles; and
    obtaining the fluoride phosphor powder which has been treated by the one or more additional cycles from the container, wherein the obtained fluoride phosphor powder has a reduced amount of the manganese relative to that in the fluoride phosphor powder before treatment.

2. The method of claim 1, wherein the fluoride phosphor powder is a fluoride phosphor activated with tetravalent manganese and represented by $K_2[M_{1-a}Mn^{4+}{}_aF_6]$,
    wherein M is at least one element selected from a group consisting of titanium (Ti), zirconium (Zr), hafnium (Hf), silicon (Si), germanium (Ge), and tin (Sn), and
    wherein α has a value of greater than zero and less than 0.2.

3. The method of claim 1, wherein the fluoride phosphor is a fluoride phosphor represented by $A_x[MF_y]:Mn^{4+}$,
    wherein A represents one or more of lithium, sodium, potassium, rubidium, or caesium,
    wherein M represents one or more of silicon, germanium, tin, titanium, zirconium, aluminum, gallium, indium, scandium, hafnium, yttrium, lanthanum, niobium, tantalum, bismuth, or gadolinium, and
    wherein x has a value of the absolute value of the charge of the $[MF_y]$ ion, and y has a value of 5, 6, or 7.

4. The method of claim 1, wherein mixing the fluoride phosphor powder with the treatment solution includes agitating a mixture of the fluoride phosphor powder and the treatment solution, and stopping the mixing includes stopping the agitation of the mixture of the fluoride phosphor powder and the treatment solution.

5. The method of claim 1, wherein mixing the fluoride phosphor powder with the treatment solution includes placing the fluoride phosphor powder in the treatment solution in a volume of the solution-to-weight of the powder ratio of at least two.

6. The method of claim 1, wherein removing at least some of the liquid includes decanting the liquid from a mixture of the fluoride phosphor powder and the treatment solution.

7. The method of claim 1, wherein stopping the mixing of the fluoride phosphor powder with the treatment solution in the container includes allowing the fluoride phosphor powder to settle within a mixture of the fluoride phosphor powder and the treatment solution for at least a second designated period of time.

8. The method of claim 1, further comprising filtering the fluoride phosphor powder, rinsing the fluoride phosphor powder, and drying the fluoride phosphor powder that is rinsed.

9. A method comprising:
mixing a fluoride phosphor powder that is doped with a dopant with a treatment solution formed from a manganese-free fluoride phosphor powder mixed with a hydrofluoric acid to form a mixture, wherein the dopant includes tetravalent manganese, wherein the fluoride phosphor powder is a complex fluoride phosphor activated with tetravalent manganese, and wherein the mixing includes placing the fluoride powder in the treatment solution in a volume of the solution-to-weight of the powder ratio of no more than five;
agitating the mixture of the fluoride phosphor powder and the treatment solution for at least first designated period of time;
stopping agitation of the mixture for at least a second designated period of time to allow liquid in the mixture to separate from the mixture;
removing at least some of the liquid from the mixture;
adding a second treatment solution, wherein the second treatment solution is a same type as the treatment solution;
repeating mixing the fluoride phosphor powder with the remaining treatment solution and the second treatment solution, agitating the mixture, stopping the agitation of the mixture, and removing the at least some of the liquid from the mixture one or more additional times; and
obtaining a remaining amount of the fluoride phosphor powder which has been treated by one or more additional cycles from the mixture, wherein the obtained fluoride phosphor powder has a reduced amount of the dopant relative to that in the fluoride phosphor powder before treatment.

10. The method of claim 9, wherein the fluoride phosphor powder is a fluoride phosphor activated with tetravalent manganese and represented by $K_2[M_{1-a}Mn^{4+}{}_aF_6]$,
wherein M is at least one element selected from a group consisting of titanium (Ti), zirconium (Zr), hafnium (Hf), silicon (Si), germanium (Ge), and tin (Sn), and
wherein a has a value of greater than zero and less than 0.2.

11. The method of claim 9, wherein the fluoride phosphor is a fluoride phosphor represented by $A_x[MF_y]:Mn^{4+}$,
wherein A represents one or more of lithium, sodium, potassium, rubidium, or caesium,
wherein M represents one or more of silicon, germanium, tin, titanium, zirconium, aluminum, gallium, indium, scandium, hafnium, yttrium, lanthanum, niobium, tantalum, bismuth, or gadolinium, and
wherein x has a value of the absolute value of the charge of the $[MF_y]$ ion, and y has a value of 5, 6, or 7.

12. The method of claim 9, wherein mixing the fluoride phosphor powder with the treatment solution includes placing the fluoride phosphor powder in the treatment solution in a volume of the solution-to-weight of the powder ratio of at least two.

13. The method of claim 9, wherein removing at least some of the liquid includes decanting the at least some of the liquid from the mixture of the fluoride phosphor powder and the treatment solution.

14. A method comprising:
mixing a fluoride phosphor powder that is doped with tetravalent manganese with a hydrofluoric acid solution, the hydrofluoric acid solution formed from a manganese-free fluoride phosphor powder mixed with a hydrofluoric acid to form a mixture, wherein the fluoride phosphor powder is a complex fluoride phosphor activated with tetravalent manganese and wherein the mixing includes placing the fluoride phosphor powder in the hydrofluoric acid solution in a volume of the solution-to-weight of the powder ratio of no more than five;
agitating the mixture of the fluoride phosphor powder and the hydrofluoric acid solution for at least first designated period of time;
stopping agitation of the mixture for at least a second designated period of time to allow liquid in the mixture to separate from the mixture;
removing at least some of the liquid from the mixture;
adding a second hydrofluoric acid solution;
repeating mixing the fluoride phosphor powder with the remaining hydrofluoric acid solution and the second hydrofluoric acid solution, agitating the mixture, stopping the agitation of the mixture, and removing the at least some of the liquid from the mixture one or more additional times; and
obtaining an amount of the fluoride phosphor powder which has been treated by the one or more additional cycles from the mixture, wherein the obtained fluoride phosphor powder has a reduced amount of manganese relative to that in the fluoride phosphor powder before treatment.

15. The method of claim 14, wherein the fluoride phosphor powder is a fluoride phosphor activated with tetravalent manganese and represented by $K_2[M_{1-a}Mn^{4+}{}_aF_6]$,
wherein M is at least one element selected from a group consisting of titanium (Ti), zirconium (Zr), hafnium (Hf), silicon (Si), germanium (Ge), and tin (Sn), and
wherein $\alpha$ has a value of greater than zero and less than 0.2.

16. The method of claim 14, wherein the fluoride phosphor is a fluoride phosphor represented by $A_x[MF_y]:Mn^{4+}$,
wherein A represents one or more of lithium, sodium, potassium, rubidium, or caesium,
wherein M represents one or more of silicon, germanium, tin, titanium, zirconium, aluminum, gallium, indium, scandium, hafnium, yttrium, lanthanum, niobium, tantalum, bismuth, or gadolinium, and
wherein x has a value of the absolute value of the charge of the $[MF_y]$ ion, and y has a value of 5, 6, or 7.

17. The method of claim 14, wherein mixing the fluoride phosphor powder with the hydrofluoric acid solution includes placing the fluoride phosphor powder in the hydrofluoric acid solution in a volume of the solution-to-weight of the powder ratio of at least two.

18. The method of claim 14, wherein removing at least some of the liquid includes decanting the at least some of the liquid from the mixture of the fluoride phosphor powder and the hydrofluoric acid solution.

* * * * *